L. K. BROWN.
FRONT WHEEL DRIVE FOR TRACTION VEHICLES.
APPLICATION FILED SEPT. 8, 1908.
939,972.
Patented Nov. 16, 1909.
2 SHEETS—SHEET 2.
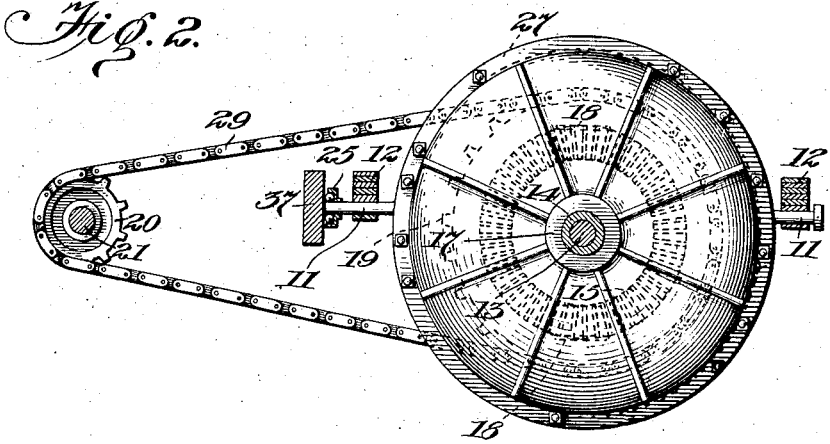
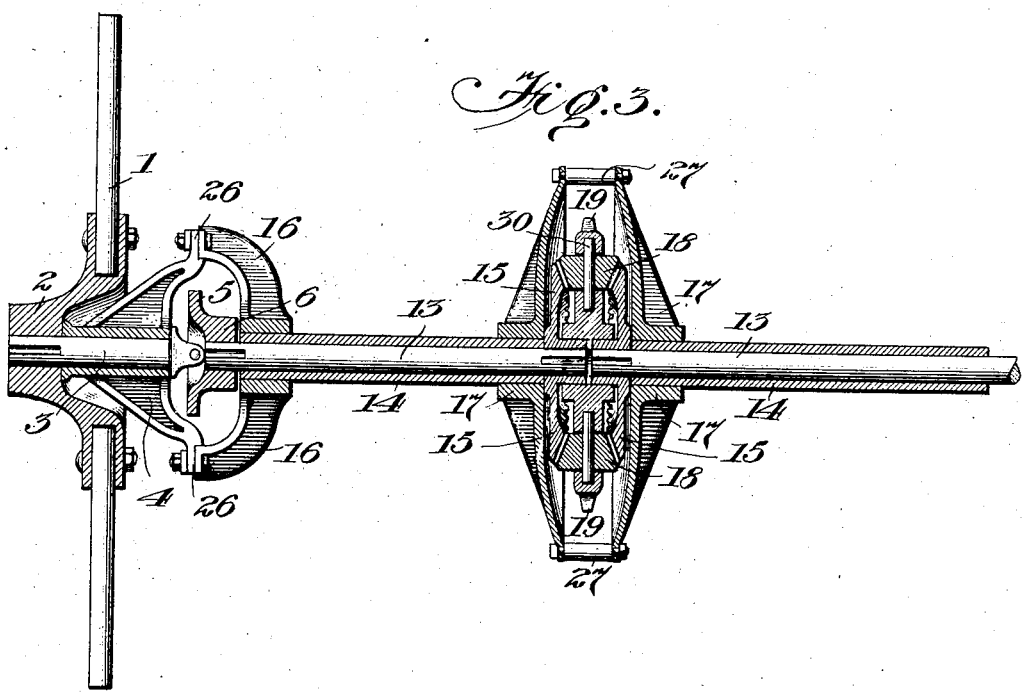
Witnesses:
Inventor:
Lewis K. Brown.

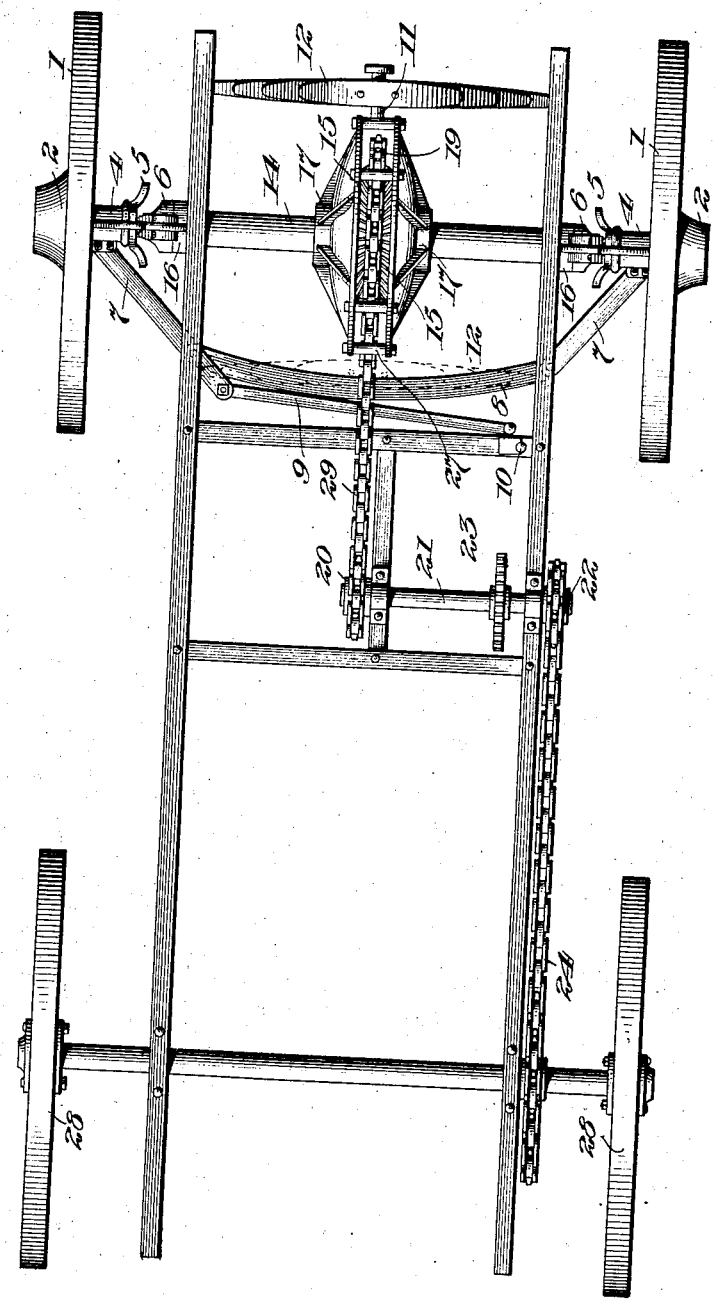

UNITED STATES PATENT OFFICE.

LEWIS K. BROWN, OF ASOTIN, WASHINGTON.

FRONT-WHEEL DRIVE FOR TRACTION-VEHICLES.

939,972.     Specification of Letters Patent.     Patented Nov. 16, 1909.

Application filed September 8, 1908. Serial No. 452,156.

*To all whom it may concern:*

Be it known that I, LEWIS K. BROWN, a citizen of the United States, residing at Asotin, in the county of Asotin and the State of Washington, have invented new and useful Improvements in a Front-Wheel Drive for Traction-Vehicles, of which the following is a specification.

The object of my invention is to provide a simple and effective appliance by which the motive power on a traction vehicle may be applied to all four of the wheels and to make it of such a design as will be practical for use on heavy, medium weight or light vehicles.

Referring to the accompanying drawings, which are made a part hereof, Figure 1 shows the general outline of a traction vehicle in which the power is applied to all four wheels. Fig. 2 is a side view of the front axle housing over the bevel differential gear and the inclosed sprocket wheel 19. Fig. 3 is a vertical section of the right hand front wheel and axle as viewed from the front.

The same numerals represent the same parts in all the figures.

I have found by an experience of over four years in building, operating and repairing a 14,000 pound vehicle of this kind, that cast iron is too brittle, and that to make the mechanism reliable most of the castings must be of steel.

The hollow pieces of axle casing 14, 14 I make of standard double extra steel pipe, putting suitable bearings on the inside of them for the inclosed live axle pieces 13, 13, to rotate in.

In the hinged boxing, or hinged portions of the axle casing 4, 4 I babbitt the bearings for the jointed pieces 3, 3 of the axle to run in.

Referring to the accompanying drawings the blocks 27, 27, the disks 17, 17, and the attached pieces of axle casing 14, 14, when assembled as shown, form a centrally disposed housing inclosing an ordinary sprocket driven differential gear 15, 15, 18, 18 and 19, which with the inclosed pieces 13, 13 of the live axle form collectively an ordinary live axle and casing.

The universal joint shown at 3, 6 connecting the laterally swingable portion of the live axle 3 with the fixed portion of the live axle 13 is a well known mechanism but must be of a form in which the axes intersect centrally at about right angles.

In order to apply the motive power to the front and steering wheels, as well as to the hind wheels, and to put the whole vehicle on yieldable springs, except the axle mechanism, I have formed the horizontal gudgeons 11, 11, on the blocks 27, 27 of the housing of the front axle. On these gudgeons are placed suitable bearings on which to fasten the center portions of a pair of leaf springs 12, 12, the outer ends of the springs carrying the front end of the vehicle, and when fastened, they hold the axle mechanism substantially at right angles to the body of the vehicle and allow the front axle to easily conform to the uneven places in the road. I place these gudgeons 11, 11 a little above the center of the housing in order to give room below them for the links 8 and 9 to move freely under them.

On the back end of the back gudgeon 11 is formed a recess for rollers to bear against a block 37 on the body of the vehicle. The block 37, through the roller bearing 11, withstands the pull of the drive chain 29 and allows the vehicle to yield easily on the springs 12, 12.

To make the vehicle guidable, I place perpendicularly hinged joints on the axle casing near each front wheel as shown in Fig. 3 at 4, 26, 16 and 14 in which 14 is the rigid axle casing, 16 is a forked casting shrunk rigidly thereon in a perpendicular position with bearings on the upper and lower ends of it to hold the gudgeons 26, 26 of the hinged boxing 4 coaxially at right angles to the center line of the casing piece 14. The castings 16 and 4 have a large enough opening between them to allow the universal joint 3, 6 on the live axle to move easily therein through all the horizontal angle range in which it is to work, and the gudgeons 26, 26 on 4 are placed so that their common axis is perpendicular and intersects the axes of the universal joint, 3, 6 in the live axle 3, 13.

Each front wheel is built on a cast hub 2 with a large recess on the inner side of it to allow the hinged boxing portion of the axle casing 4 to pass into the wheel and have a bearing over the base of the wheel 1 on the hinged portion of the live axle 3, the outer projection of the hub 2 being keyed rigidly to the outer end of the piece 3 of the live axle.

On the back side of the hinged boxing 4, 4 are fastened horizontal rearwardly and inwardly projecting arms or bell cranks 7, 7, the back ends of these arms 7, 7 are pivoted to the link 8 which holds the two front wheels substantially parallel to each other; on one of these arms 7 is pivoted the link 9 which connects with a steering head as at 10.

In operation it can be seen that when power is applied to rotate the counter shaft 21 the sprocket wheel 22 carrying the sprocket chain 24 will rotate the hind wheels 28, 28, and the sprocket wheel 20 on the counter shaft 21 will drive the chain 29 over the sprocket wheel 19 in the housing of the front axle mechanism and thus simultaneously rotate the front wheels 1, 1 causing the vehicle to move over the ground. The vehicle can be guided by means of a steering head placed at 10 and connected by the link 9 to an arm 7, the link 8 connecting the arms 7, 7 which are fastened to the hinged boxing 4, 4, adjusting the jointed pieces 3, 3 of the live axle and the attached wheels 1, 1, thus guiding the vehicle in the desired direction.

Having thus described my invention what I claim is:

1. With an axle casing and housing inclosing a centrally disposed differential gear and inclosed driving sprocket wheel, having live axle pieces rotatably located within the casing and connected at their inner ends with a differential gear, the combination of coaxial perpendicular hinges on the axle casing between the central housing and the wheels, near each end of the casing and a short distance from each of the wheels, a bell crank fastened on the back of each of the laterally swingable portions of the axle casing and extending rearwardly therefrom, a universal joint in the live axle intersected by the axis of the vertical hinge on the axle casing, a laterally swingable portion of the live axle connected with the universal joint and journaled in the laterally swingable portion of the axle casing and protruding outwardly through the end of the swingable portion of the axle casing, a wheel hub with an outwardly projecting collar keyed rigidly on the protruding end of the swingable piece of live axle, a roomy recess being formed on the inner side of the hub on the rim of which a wheel is built in a plane intersecting the swingable piece of live axle through its bearing in the swingable piece of axle casing; horizontal gudgeons forwardly and rearwardly disposed on the centrally located housing of the differential gear, a recess on the back end of the back gudgeons, rollers in the recess and a bearing on the yieldably supported body of the vehicle back of and against the rollers, bearings rotatably fastened on the gudgeons, leaf springs across the bearings and fastened thereto the outer ends of the springs being fastened across under the front end of the body of the vehicle supporting it yieldably and holding the axle mechanism substantially at right angles across the front of the vehicle.

2. In a front axle casing and housing having inclosed sections of a live axle and a differential and driving gear centrally located the combination therewith of horizontal gudgeons forwardly and rearwardly placed thereon centrally, a roller bearing between the back end of one of the gudgeons and the body of the vehicle, leaf springs fastened across the gudgeons and under the front end of the vehicle to carry it yieldably and hold the axle mechanism substantially at right angles to the body of the vehicle, co-axial vertical hinges on the axle casing near the outer ends, bell cranks on the hinged pieces of the axle casing and extending rearwardly, universal joints in the two sections of the live axle concentric with the vertical hinges on the axle casing, recessed wheels with outwardly projecting hubs keyed on the outer ends of the jointed axle, the planes of the wheel tires intersecting the axle bearings in the hinged portions of the axle casing.

LEWIS K. BROWN.

Witnesses:
 M. P. SHAUGHNESSY,
 W. S. ROGERS.